United States Patent [19]

Singhal

[11] Patent Number: 5,225,998
[45] Date of Patent: Jul. 6, 1993

[54] QUALITY CONTROL USING MULTI-PROCESS PERFORMANCE ANALYSIS

[75] Inventor: Subhash C. Singhal, Marlboro, N.J.

[73] Assignee: AT&T Bell Laboratories, Murray Hill, N.J.

[21] Appl. No.: 912,083

[22] Filed: Jul. 9, 1992

Related U.S. Application Data

[63] Continuation of Ser. No. 500,354, Mar. 26, 1990, abandoned.

[51] Int. Cl.$^5$ .............................................. G06F 15/20
[52] U.S. Cl. .................................... 364/554; 364/578
[58] Field of Search ............... 364/554, 550, 552, 402, 364/578

[56] References Cited

U.S. PATENT DOCUMENTS

| | | | |
|---|---|---|---|
| 3,150,253 | 9/1964 | Spergel | 364/563 X |
| 3,526,836 | 9/1970 | Deger et al. | 364/554 X |
| 3,876,872 | 4/1975 | Spitz | 364/554 X |
| 4,320,463 | 3/1982 | Himmelstein | 364/552 |
| 4,752,897 | 6/1988 | Zoeller et al. | 364/550 |

OTHER PUBLICATIONS

*Statistical Quality Control Handbook,* published 1956, by Western Electric Co., Inc., pp. 5-31.

I. Miller et al., *Probability and Statistics for Engineers,* published by Prentice-Hall, Inc. 2nd Ed. (1977) p. 487.
Sullivan, "Reducing Variability: A New Approach to Quality", *Quality Progress,* Jul. 1984, pp. 15-21.
Kane, "Process Capability Indices", *Journal of Quality Technology,* vol. 18, No. 1, Jan. 1986, pp. 41-52.

*Primary Examiner*—Jack B. Harvey
*Assistant Examiner*—Ellis B. Ramirez
*Attorney, Agent, or Firm*—Frederick B. Luludis

[57] ABSTRACT

A new graphical tool, called a multi-process performance analysis chart, can be used in a quality control method for analyzing the performance of a group of processes in a multi-process environment. The method achieves at least three objectives. One, the method is useful for aggregating on one chart the overall status of a group of processes. Departures of process mean values from target values are readily interpreted from the chart as are process variabilities and process capability indices. Estimates of the expected fallout of a process parameter with respect to its tolerance are also readily generated. Two, the method allows for prioritizing quality improvement efforts in complex operations, which may comprise many processes. And three, the method allows for quantifying improvements resulting from reductions in the departures of process means from target values and from reductions in process variabilities.

14 Claims, 5 Drawing Sheets

FIG. 4

CPU &CPL VALUES FOR 10.0% CONTOUR CURVE

| CPU | CPL | $S_U$ | $S_L$ | $F_U$ | $F_L$ | EXPECTED FALLOUT |
|---|---|---|---|---|---|---|
| 3.000 | 0.4272 | 9.0000 | 1.2816 | 0.0 | 10.0 | 10.0 |
| 2.000 | 0.4272 | 6.0000 | 1.2816 | 0.0 | 10.0 | 10.0 |
| *1.000* | *0.4300* | *3.0000* | *1.2900* | *0.13* | *9.87* | *10.0* |
| 0.900 | 0.4340 | 2.7000 | 1.3020 | 0.35 | 9.65 | 10.0 |
| 0.800 | 0.4430 | 2.4000 | 1.3290 | 0.82 | 9.18 | 10.0 |
| 0.700 | 0.4640 | 2.1000 | 1.3920 | 1.79 | 8.21 | 10.0 |
| 0.600 | 0.5070 | 1.8000 | 1.5210 | 3.59 | 6.41 | 10.0 |
| 0.548 | 0.548 | 1.6440 | 1.6440 | 5.00 | 5.00 | 10.0 |
| 0.5070 | 0.600 | 1.5210 | 1.8000 | 6.41 | 3.59 | 10.0 |
| 0.4640 | 0.700 | 1.3920 | 2.1000 | 8.21 | 1.79 | 10.0 |
| 0.4430 | 0.800 | 1.3290 | 2.4000 | 9.18 | 0.82 | 10.0 |
| 0.4340 | 0.900 | 1.3020 | 2.7000 | 9.65 | 0.35 | 10.0 |
| 0.4300 | 1.000 | 1.2900 | 3.0000 | 9.87 | 0.13 | 10.0 |
| 0.4272 | 2.000 | 1.2816 | 6.000 | 0.0 | 10.0 | 10.0 |
| 0.4272 | 3.000 | 1.2816 | 9.000 | 0.0 | 10.0 | 10.0 |

NOTE:

$$F_U = \int_{USL}^{\infty} \frac{1}{\sigma\sqrt{2\pi}} \exp\left[-\frac{1}{2}\left(\frac{X-\mu}{\sigma}\right)^2\right] dx$$

$$F_L = \int_{-\infty}^{LSL} \frac{1}{\sigma\sqrt{2\pi}} \exp\left[-\frac{1}{2}\left(\frac{X-\mu}{\sigma}\right)^2\right] dx$$

$$S_U = \frac{USL - \mu}{\sigma}$$

$$S_L = \frac{\mu - LSL}{\sigma}$$

QUALITY CONTROL USING MULTI-PROCESS PERFORMANCE ANALYSIS

This application is a continuation of application Ser. No. 500354, filed on Mar. 26, 1990 now abandoned.

BACKGROUND OF THE INVENTION

1. Field of the Invention

This invention relates to quality control and, more particularly, to quality control in a multi-process environment whereby the quality of a plurality of processes can be analyzed in the aggregate for improving the overall quality of the multi-process environment.

2. Description of the Prior Art

Broadly speaking, there are at least three steps in a typical quality control process: (i) a definition of the specification of what is wanted; (ii) the production of things or units or product to satisfy the specification; and (iii) the inspection of the things produced so as to ascertain whether or not the things satisfy the specifications.

Consider a manufacturing environment in which there are commonly a plurality of processes, also known as stages or phases, among other names, through which an article of manufacture, also known as a product, a thing, or a unit, passes. For example, with an automobile assembly line, there are a number of processes in a multi-process environment such as a first process for assembling the frame of the automobile, a second process of assemblying the body of the automobile, a third process of assemblying the engine, a fourth process of assemblying the interior, a fifth process of assemblying the optional items for the particular automobile, etc. In turn, each process typically includes one or more process parameters, which have target values and tolerances, which reflect design criteria or specifications. To obtain and maintain a reasonable degree of quality in the manufacturing process, it is desirable to monitor, for example, by sampling selected parameters of the product being manufactured at the different stages in the manufacturing process. Typically, the sampling would involve an analysis of the product at each, or at selected ones, of the N-processes that go to make up the multi-processing environment.

As the parameters of the product are sampled, it becomes desirable to have some structured methodology to interpret the data acquired during the sampling process. This desirability gave rise, some many years ago, to the use of what are commonly called quality control charts. The general form of a quality control chart depicts some measure of some process parameter on the ordinate and some other variable, usually time or order of production, on the abscissa. The parameter measure may be an estimate of some characteristic like the mean or standard deviation or some percentage measure of the things, which are sampled, to evidence, for example, whether or not the thing being produced satisfies the specifications. A control chart for each parameter of each process in a multi-process environment is typically produced and interpreted in some manner as a measure of the quality of the manufacturing process. It is typical that adjustments are considered and sometimes made to the manufacturing process in response to the interpretation of the quality measure. Unfortunately, the interpretation procedures tend to focus on the individual parameters of each stage of the manufacturing process. This typically results in a need to interpret many control charts, often literally hundreds of control charts. So while a control chart is an excellent tool for monitoring a process on a routine basis, it is often extremely difficult and time consuming for a shop supervisor or engineer or other person monitoring the manufacturing process to analyze each chart on an individual basis. Also, even though the charts of the individual process parameters may be interpreted, it is difficult, at best, to interpret the quality of the overall multi-process environment through the use of known control charts.

SUMMARY OF THE INVENTION

These and other problems are solved using the principles of my invention which include a method, a system and apparatus for improving quality in a multi-process environment. There are one or more processes, each process having one or more process parameters, each process parameter having predetermined tolerances. Information is monitored about selected ones of the process parameters. The monitored information is used in generating statistical estimates. The statistical estimates are for estimating predetermined characteristics, like mean or standard deviation, of the process parameters. The method, system and apparatus include generating first and second statistical measurement indices of the process parameters and aggregating the indices. The aggregated indices are represented in multi-dimensional space representation. Respective ones of the indices are compared with other respective ones of the aggregated indices and with a predetermined reference measure. Based on the comparison, the relative performance of the respective measured process parameters is evaluated and a determination is made as to which of the process parameters are most likely to need adjustment in order to improve the quality of the multiprocess environment. The process parameters which need adjustment can be adjusted in some prioritized order, for example, according to any of a number of criteria such as absolute or relative departure from target value, variability, minimum of the first and second statistical measurement indices for a process parameter, or expected fall-out.

BRIEF DESCRIPTION OF THE DRAWINGS

My invention should become more apparent from the following detailed description when taken in conjunction with the accompanying drawings in which:

FIG. 4 illustrates in table format a specific example, which is useful in illustrating the expected fall-out feature of the principles of my invention.

DETAILED DESCRIPTION

Figure 1:
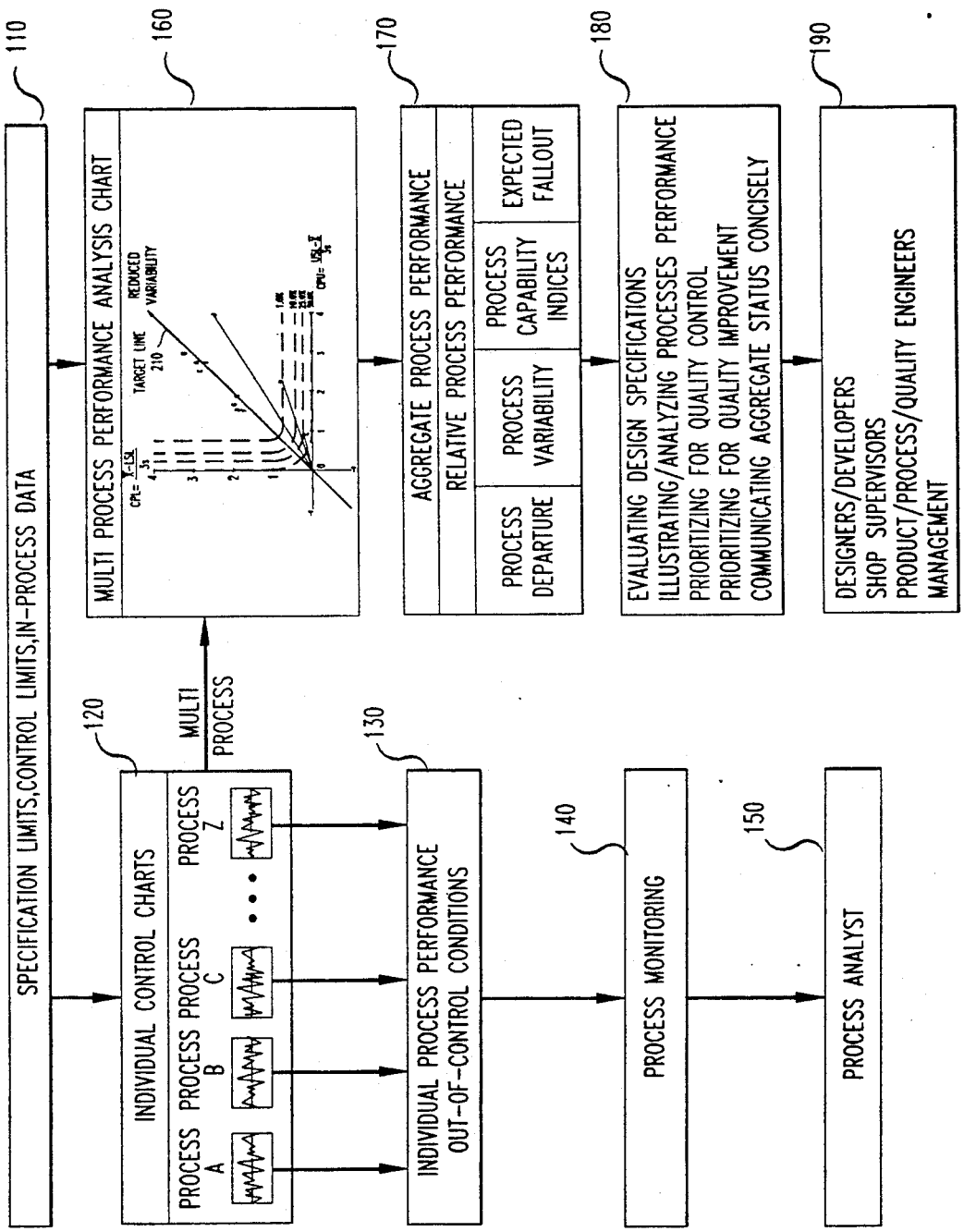
FIG. 1 illustrates a quality control process and is useful in describing the principles of my invention.

For purposes of illustration and not by way of limitation, FIG. 1 illustrates a quality control process and the following example is intended to use that process to exemplify the art of quality control, both as exists in the prior art and as it is improved upon through employing the principles of my invention, as well as to serve as a means to communicate an understanding of the principles of my invention as those principles offer certain advantages in a multi-process environment.

Assume a multi-process environment includes one process, call it process A, which involves the drilling of a hole in a steel bar. Conceptualize that process A contemplates a series of steel bars moving down an assembly line in such a manner that, as each steel bar reaches a certain location on the assembly line, a hole is drilled in each respective bar. The process specifications 110 typically recite some intended diameter for the hole in each bar. The intended diameter, which is a specification for the hole, is usually referred to as the "target" value, or T. Assume also that there are upper and lower specification limits, which are tolerances of the hole around target value T. The upper and lower specification limits, called respectively USL and LSL, could be the maximum diameter and the minimum diameter, respectively, of the hole. In a manufacturing environment, the individual observations, or in-process data 110, are the sampled measurements of the diameter of the hole in each or in some selected number of the steel bars and give rise to certain characteristics like mean and standard deviation of the sampled measurements. As in the prior art, individual control charts 120 can be generated for each process parameter. Although I have been using process A as an example, my methodology is readily extendible to a plurality of processes, which gives rise to a multi-process environment that includes any number of processes, say processes numbered A through Z. Also in the prior art, out-of-control conditions 130 of the individual processes can be detected and monitored 140 and analyzed 150 for appropriate single process parameter adjustment.

Having recited a procedure for a single process in what could be a multi-process environment, the description now turns to a discussion of a multi-process performance analysis, which is in accordance with the principles of my invention and which is conveniently described through the tool of a multi-dimensional space representation of certain measured process parameters. For ease of description, I illustratively use a two-dimensional multi-process performance analysis chart 160, it being understood that the principles of my invention also apply to a multidimensional space representing which has more than two dimensions. The new chart can be generated using the principles of my invention for aggregating 170 the performance of a plurality of processes and for evaluating, prioritizing, and communicating 180 adjusting data to personnel and systems 190 for appropriate multi-process quality control. Thereby, an advancement in the art is achievable.

Figure 2:
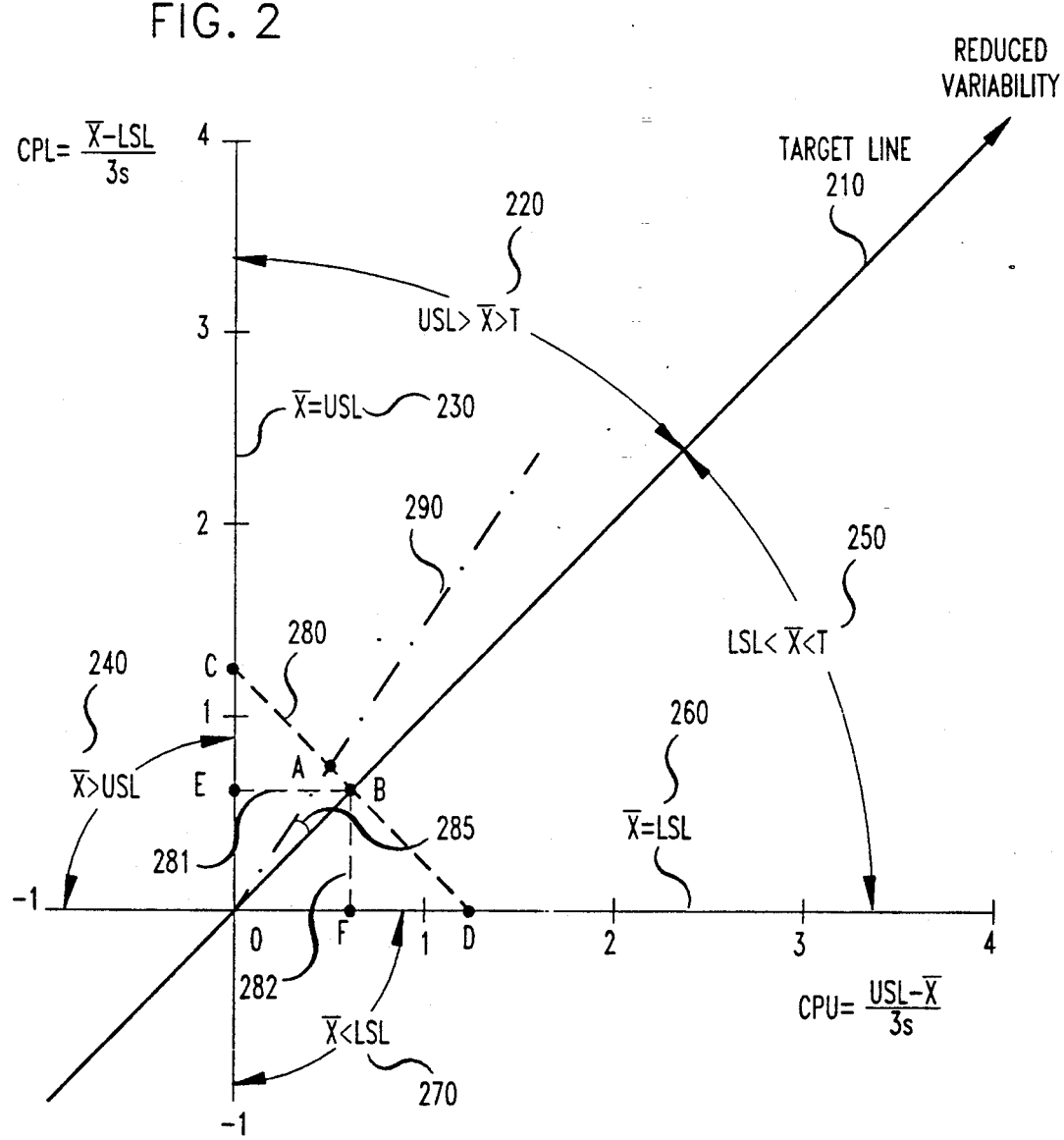
FIG. 2 illustrates a multi-process performance analysis chart that is useful in describing the principles of my invention.

In FIG. 2, which illustrates in more detail multi-process performance analysis chart 160 of FIG. 1, the x-axis, or the abscissa, represents a first statistical measure, here illustratively an upper process capability index, called CPU, while the y-axis, or ordinate, represents a second statistical measure, here illustratively a lower process capability index, called CPL. Such measures as well as other statistical measures, some of which are hereinafter discussed, are well known in the art. See, for example, Victor E. Kane, "Process Capability Indices", *Journal of Quality Technology*, Vol. 18, No. 1, January 1986, pp. 41-52. Still other measures, for example, a measure, which reflects the cost savings to the entire multiprocess by adjusting a process parameter, could be used. Continuing with my example, commonly used mathematical formula for CPU and CPL are:

$$CPU = \frac{USL - x}{3s} \quad (1)$$

$$CPL = \frac{x - LSL}{3s} \quad (2)$$

where, as mentioned earlier, USL is an upper specification limit 110, which is a given design value, and where LSL is a lower specification limit 110, which is another given design value, and where $\bar{x}$ is a statistical estimate of the mean $\mu$ of the individual observations 110 in the sampling of one parameter of one process of a multi-process environment and where s is a statistical estimate of the standard deviation $\sigma$ of the individual observations 110 in the sampling of the one parameter of the one process of the multi-process environment. More generally speaking, specification limits or control limits are called tolerances in the art, while the mean or standard deviation are called characteristics of the statistical distribution of a sampled process parameter. Continuing, there is, therefore, a multidimensional data point which can be generated for each process parameter that may be sampled and that data point can be plotted in multi-dimensional space as a representation of the measured indices of the process parameters, which in this illustrative example, can be plotted into and shown on multi-process performance analysis chart 160, for example, as data point A as shown in FIG. 2.

Experience in the art has shown that values of CPU or CPL in excess of positive four (+4) are indicative of a process parameter that has very low variability in the sense that sampled observations will be relatively close to each other and further, if values of CPU and CPL are also relatively close to each other, then, the sampled observations will be (a) well within the specification limits, and (b) close to the target value, the combination of which is interpreted to mean that the arithmetical mean $\bar{x}$ of the sampled observations will approach, in value, target value T. Experience has also shown that values of CPU or CPL less than negative one (−1) are indicative of a process that has a very high departure in the sense that the arithmetic mean $\bar{x}$ of the sampled observations will be outside the upper (i.e. USL) or lower (i.e. LSL) specifications limit, respectively, i.e. outside the tolerances. Therefore, and again by way of illustration and not by way of limitation, FIG. 2 highlights values of CPU and CPL between minus one and plus four.

Having thus far described the basic structure of FIG. 2, I now turn to a discussion of certain advantages that flow from the principles of my invention. To illustrate those and other advantages, I will now discuss the process of generating data points for chart 160 as illustrated in FIG. 2 and the process of aggregating 170 the data points of a multi-process environment onto a multidimensional space representation, and the process of interpreting the data points for evaluating, prioritizing, and determining individual performance criteria 180 of each process parameter, and hence offer an improvement under rules of processes 180 and 190 vis-a-vis the rules of prior art processes 140 and 150. It ought to be pointed out that processes 170, 180 and 190 may be in addition to or in lieu of processes 130, 140 and 150.

Each process in a multi-process environment may have one or more parameters that may be statistically monitored 110 for purposes such as quality control. For example and following on the earlier hole drilling example, a first process, which we called process A, may have two parameters being measured such as the diameter of the hole and the depth of the hole. Each parameter would have its own set of design specifications, including target value and tolerance, 110. In my example, the first parameter is the diameter of the hole, which has a target value and tolerances such as a maximum diameter and a minimum diameter, which would be the USL and the LSL, respectively, of the first parameter. As to the second parameter, the depth of the hole has a target value and tolerances such as a maximum depth and a minimum depth, which would be the USL and the LSL, respectively, of the second parameter. Inasmuch as the design specification limits, or tolerances, are known, then each of the two parameters may be statistically measured in such a manner as to permit the sampling methodology 110 to generate values for CPU and CPL for each of the two process parameters of process A. As the steel bar moves to the next stage of the assembly line more shaping can occur. For example, the next stage could involve a second process, call it process B, which could include an arrangement for threading the drilled hole. In the quality control of the second process B, it may be deemed sufficient to measure the pitch of the thread. As before, the design specifications 110 for the threading process B will include a target value and a USL and a LSL as its tolerances. Statistical monitoring of the threaded hole will similarly allow for the generating of a CPU and a CPL for the second process.

Practitioners of quality control, who use the prior art, would often generate a control chart 120 for each of the three process parameters just described and interpret the individual process performance 130 by monitoring the three parameters 140 and by analyzing the two processes 150. However, in accordance with the principles of my invention, having generated two data points from the first process and having generated one data point from the second process, the three data points may be plotted onto FIG. 2 whereby the multi-process environment may be interpreted in the aggregate rather than simply as three individual process parameters. As a slight aside, while my present example is useful for illustrating the methodology attendant to a multi-process environment, which includes two processes and three process parameters, it can be readily extended for generating data points, i.e. sets of data points in multidimensional space, for each process parameter in each process of an N-process multi-process environment.

It is important in understanding the principles of my invention to recognize that the quality control process may, but need not, include the generating of the individual control charts 120 as in the prior art for monitoring 140 the quality control process for each parameter in each process of the multi-process environment. However, additional advantages are obtained in accordance with the principles of my invention by generating the data points for each process parameter and aggregating the data points on chart 160, such as is shown in FIG. 2. In that manner, my new chart 160 shown in FIG. 2 aggregates the statistical measures of all or of selected parameters of each process in a multi-process environment. It is that aggregation of many process parameters from many processes onto a single multidimensional space representation like chart 160, which advantageously allows for the parameters of a multi-process environment to be studied and interpreted in such a manner that the overall quality process, rather than the individual quality processes can be improved.

Having discussed the general structure of the chart in FIG. 2, and having discussed a multi-process environment, which includes different numbers of process parameters being measurable for each of N-processes, and having discussed the methodology for generating one or more statistical measures of each process parameter and having discussed the methodology of representing the one or more measures in multi-dimensional space, it is now convenient to discuss a manner of interpreting the multidimensional data points illustrated on chart 160 shown in FIG. 2. As an aside, I have discussed two statistical measures, i.e. CPU and CPL; however, additional measures, such as measures which reflect the cost savings to the entire multi-process by adjusting a process parameter, or such as those measures sometimes called process capability indices based on specification limits in the quality control art or such as those measures based on control limits, may be generated and the resultant data points may be illustrated on a two or more dimensional version of chart 160.

Toward the end of interpreting the (CPU, CPL) data points illustrated on FIG. 2, I will now describe four different process performance criteria which can be determined from the aggregated data points of FIG. 2. These criteria, which can be used for determining which of the process parameters are the more likely to need adjustment in order to improve the quality of the multi-process environment, can be included in the aggregate process performance 170 and are globally referred to as:

1. The departure of process parameters:
2. The variability of process parameters;
3. Other process capability indices such as another statistical measure called CPK, which is defined to be the minimum one of either CPU or CPL for each (CPU, CPL) data point;
4. An estimate of the number of readings of a parameter which will be outside specifications limits, called the expected "fallout".

1. DEPARTURE OF PROCESS PARAMETERS

Let us discuss a methodology for estimating the departure of the arithmetic mean $\bar{x}$ of the individual observations of a process parameter from its target value T.

First, assume that the arithmetic mean $\bar{x}$ of the individual observations of a sampled process parameter equals its target value T. Also, assume that the specification limits, or tolerances, are symmetrical around the target value. Those assumed facts can be mathematically illustrated as:

$$\bar{x} = T, \text{ or}$$

$$\bar{x} = \frac{USL + LSL}{2}, \text{ or}$$

$$USL - \bar{x} = \bar{x} - LSL, \text{ or}$$

$$\frac{USL - \bar{x}}{3s} = \frac{\bar{x} - LSL}{3s}, \text{ or}$$

-continued $$CPU = CPL.$$

Therefore, when the process parameter's arithmetic mean equals the target value, the first statistical measure CPU equals the second statistical measure CPL. This result is illustrated in FIG. 2 by a line in the first quadrant of chart 160, which line is drawn at a 45 degree angle with respect to both the abscissa and the ordinate and which line is identified as target line 210 in FIG. 2. Accordingly, any (CPU, CPL) data point lying on target line 210 will have the property that its arithmetic mean equals its target value, i.e. $\bar{x}=T$. And that fact is interpreted to mean that there is no departure between the arithmetic mean of the sampled process parameter and the target value of the process parameter.

Second, when the process parameter's arithmetic mean is greater than its target value, the first statistical measure CPU is less than the second statistical measure CPL. To understand how one can come to that conclusion, recall that the upper and lower specification limits, i.e. USL and LSL, are assumed in our example to be symmetrical around the target value. Those assumed facts may be stated mathematically as:

$$\bar{x} > T = \frac{USL + LSL}{2}$$

which from the earlier mathematics means that:

CPU<CPL

Therefore, when the arithmetic means is greater than the target value, the first measure CPU is less than the second measure CPL. This result is illustrated in FIG. 2 as the area in the first quadrant which is above target line 210 and is symbolized in FIG. 2 by the area included in arc 220. Accordingly, any process parameter with a (CPU, CPL) data point lying above target line 210 will have the property that its arithmetic means is greater than it target value and hence such a data point on chart 160 can be interpreted to mean (a) that there is a departure between the arithmetic mean and the target value of the process parameter in question and (b) that the departure is directed toward the upper specification limit, USL, meaning that the arithmetic mean of the parameter has a value greater than its target value. Note that this conclusion makes sense since, by definition, USL is greater than the target value. Of course, also by definition, the LSL would never be greater than the target value.

Also, note that, on the one hand, when the arithmetic mean is equal to the USL, then CPU is equal to zero and the corresponding data point for the process parameter would lie on the y-axis, or ordinate. Accordingly, any process parameter with a (CPU, CPL) data point lying on the y-axis of chart 160 will have the property that its arithmetic mean is equal to its USL. This result is symbolized in FIG. 2 by line 230, which is a line that coincides with the ordinate. On the other hand, when the arithmetic mean is greater than the USL, then CPU will be negative and the data point for the process parameter would lie in the second quadrant of chart 160. Accordingly, any process parameter with a (CPU, CPL) data point lying in the second quadrant of chart 160 will have the property that its arithmetic mean is not only greater than its target value but is also greater than its USL. This result is symbolized in FIG. 2 by the area included in arc 240, which is the area of the second quadrant of FIG. 2.

Third, when the process parameter's arithmetic mean is less than its target value, the first statistical measure CPU is greater than the second statistical measure CPL. To understand how one can come to that conclusion, recall that the specification limits are assumed to be symmetrical around the target value. Those assumed facts may be expressly mathematically as:

$$\bar{x} < T = \frac{USL + LSL}{2}$$

which from the earlier mathematics means that:

CPU>CPL.

Therefore, when the arithmetic mean is less than the target value, the first measure CPU is be greater than the second measure CPL. This result is illustrated in FIG. 2 as the area in the first quadrant which is below the target line 210 and is symbolized in FIG. 2 by the area included in arc 250. Accordingly, any process parameter with a (CPU, CPL) data point lying below target line 210 will have the property that its arithmetic mean is less than its target value and hence such a data point on chart 160 can be interpreted to mean (a) that there is a departure between the arithmetic mean and the target value of the process parameter in question and (b) that the departure is directed toward the lower specification limit, LSL, meaning that the arithmetic mean of the parameter has a value less than its target value. Note that this conclusion makes sense since, by definition, the LSL is less than the target value. Of course, by definition, the USL would never be less than the target value.

Also note that, on the one hand, when the arithmetic mean is equal to the LSL, then CPL is equal to zero and the corresponding data point for the process parameter would lie on the x-axis, or abscissa. Accordingly, any process parameter with a (CPU, CPL) data point lying on the x-axis of chart 160 will have the property that its arithmetic mean is equal to its LSL. This result is symbolized in FIG. 2 by line 260, which is a line that coincides with the abscissa. On the other hand, when the arithmetic mean is less than the LSL, then CPL will be negative and the data point for the process parameter would lie in the fourth quadrant of chart 160. Accordingly, any process parameter with a (CPU, CPL) data point lying in the fourth quadrant of chart 160 will have the property that its arithmetic mean is not only less than its target value, but is also less than its LSL. This result is symbolized on FIG. 2 as the area included in arc 270, which is the area of the fourth quadrant of FIG. 2.

It may be worth mentioning that, in view of the definitional assumptions that USL is greater than the target value T and that LSL is less than the target value T, there will never be a (CPU, CPL) data point in the third quadrant of chart 160.

Fourth, the description of the concept of departure has thus far been presented from the point of view of an absolute difference between the arithmetic mean and the target value. I will now turn to a third statistical measure that is useful in describing the concept of departure from the point of view of a relative measure, vis-a-vis an absolute difference.

A third statistical measure, which is known in the art and which is commonly given the symbol k, may now be described. The purpose of the following description is not to assert that the third measure is a new statistical measure, but rather is to assert that the third measure can be advantageously interpreted from chart 160. The third measure is for measuring the relative departure of a process parameter. A relative measure has a property that allows comparisons among different process parameters, either in the same process or in different processes in a multi-process environment, to, in the case of relative departures, advantageously compare, in the aggregate, the relative departures among a plurality of process parameters. Such comparisons can be a useful tool in determining which of the process parameters are the more likely to need adjustment in order to improve the quality of a multi-process system.

One known relative measure k may be used as my third statistical measure and may be arithmetically recited as:

$$k = \frac{\bar{x} - T}{USL - T} \text{ if } \bar{x} > T$$

and $$k = \frac{T - \bar{x}}{T - LSL} \text{ if } \bar{x} < T.$$

Since the upper and lower specification limits, or tolerances, are assumed to by symmetrical around the target value, the above arithmetic recitation may be restated as:

$$k = \frac{|\bar{x} - T|}{\frac{USL - LSL}{2}} \quad (3)$$

It should be clear that the third measure k, again which is a relative measure, measures the ratio between (a) the absolute departure of the arithmetic mean from the target value of a process parameter and (b) the difference between the upper or lower specification limit and the target value.

The third measure may be readily generated for interpretation from new chart 160 of FIG. 2. Consider the (CPU, CPL) data point labeled as point A on FIG. 2. To generate the third measure k, construct a line labeled as line 280 through point A in such a geometric manner that line 280 is perpendicular to, and intersects, target line 210 at a point labeled as point B. Line 280 intersects the y-axis at a point labeled as point C and the x-axis at a point labeled as point D. Third measure k can be restated as equal to the ratio of two segments of line 280, i.e. the ratio of the length of line AB to the length of line CB, or mathematically as:

$$k = \frac{AB}{CB}$$

where AB is the length of line segment AB and CB is the length of line segment CB. Note, through simple trigonometric relations, the third measure k is also equal to the tangent of angle 285, which is formed at the intersection of line 290 and target line 210 where line 290 is a line drawn through point A and through the origin of chart 160.

Following the described methodology, it is clear that the third measure can be generated for each process parameter that is represented by a (CPU, CPL) data point on chart 160.

Fifth, I will now turn to a description of the departure of one process parameter relative to another process parameter where the two parameters could be in the same process or could be in different processes. The approach taken will build upon the foregoing description of the third statistical measure k.

On the one hand, the third measure k may be generated for each of two or more (CPU, CPL) data points, and hence process parameters, illustrated on FIG. 2. The thus generated third measures may be rank ordered from lowest value to highest value. Such an ordering would correspond to a one-to-one rank ordering of process parameters from the lowest relative departure to the highest relative departure.

On the other hand, a series of lines like line 290 can be drawn, each between the origin of chart 160 in FIG. 2 to each respective process parameter (CPU, CPL) data point illustrated on FIG. 2. Following on my earlier description, a series of third statistical measures k, i.e. the relative departure measure, can be generated where each respective measure is equal to the trigonometric tangent of the angle formed between the target line 210 and each of the series of lines like line 290, and hence a series of angles like angle 285 can be formed. Accordingly, the rank ordering of the relative departures is in one-to-one correspondence with a similar rank ordering of the angles like angle 285 thus formed. Therefore, the process parameter with the largest angle is the same process parameter with the highest relative departure.

This result can be used to prioritize the processes and the process parameters that are more likely to need adjustment in order to improve the quality of the multi-process environment. For example, if in the quality control process, one is focused on departure as a primary issue then the rank ordered angles 285 being in one-to-one correspondence with the rank ordering of relative departures k, readily enable a determination of which process parameters ought to be addressed from a quality improvement point of view and the order in which those process parameters ought to be adjusted to obtain the most significant quality improvement with respect to departure in the multi-process environment.

2. VARIABILITY OF PROCESS PARAMETERS

Let us discuss a methodology for estimating the variability of a process parameter with respect to the difference, or spread, between the upper specification limit, USL, and the lower specification limit, LSL.

First, it is well known in the art that standard deviation is a characteristic of a process parameter, which can be used as a statistical measure of the variability of a process. In our discussion an estimate of the standard deviation has been symbolized by s.

Relative variability will be taken to mean the ratio of the standard deviation s to the spread, USL-LSL, i.e., $$\text{Relative variability} = \frac{s}{USL - LSL} \quad (4)$$

As described earlier for the third measure k, a line can be constructed through a (CPU, CPL) data point for a process parameter in such a geometric manner that the line is perpendicular to target line 210. In our example, line 280 is constructed through data point A in such a manner that line 280 is perpendicular to target line 210 and that line 280 intersects target line 210 at point B. Also, note that line 280 interests the y-axis at point C and the x-axis at point D. For every point on line 280, the ratio:

$$\frac{USL - LSL}{3s} \quad (5)$$

is a constant and is equal to the CPL value at point C of the ordinate and is equal to the CPU value at point D of the abscissa. The meaning of the constant ratio is that all data points on line 280 have equal variability relative to the spread, or difference, between upper and lower specification limits.

These facts taken together lead one to conclude that as line 280 "moves away" from the origin, i.e., as the intersecting point B moves along target line 210 and away from the origin of chart 160, intersecting points C and D would move in a positive direction on the y-axis and x-axis, respectively. That means that the constant ratio is increasing, which, for a fixed value of the spread, means the standard deviation s is decreasing and the relative variability of the process parameter is decreasing. That conclusion is expressed in FIG. 2 by the arrow on target line 210 pointing in the direction of the words REDUCED VARIABILITY. Therefore, in a multi-process environment where it is likely that the many (CPU, CPL) data points for the many process parameters would be illustrated on chart 160, it is clear that lines like line 280 can be drawn for each respective one of a plurality of process parameter data points. In accordance with the principles of my invention, it is clear that the process parameters can be rank ordered in terms of relative variability where the rank ordering is in one-to-one correspondence with the intersecting points of respective lines like line 280 at respective points like point B on target line 210. Noteworthy, the rank ordering can give rise to another prioritization ordering for dealing with the adjustment of processes and process parameters to improve the quality control of the multi-process environment.

It is useful to point out that process parameters represented by data points on chart 160 may be interpreted to have relative variability as follows:

The closer to the origin that intersecting points like point B occur on target line 210 means the higher the relative variability of the corresponding process parameter while the further away from the origin on target line 210 that the intersection occurs means the lower the relative variability of the corresponding process parameter.

From the above, it is readily clear that the origin is the point of maximum relative variability.

Second, still another statistical measure, which is yet another well-known capability index for measuring process variability, is also readily determinable from chart 160 in FIG. 2. Specifically, a fourth statistical measure can be defined mathematically as:

$$Cp = \frac{USL - LSL}{6s} \quad (6)$$

Comparing equation (5) and equation (6) makes clear that the value of the fourth statistical measure Cp is equal to one-half the value of the first statistical measure CPU, when evaluated at point D in FIG. 2, and is equal to one-half the value of the second statistical measure CPL, when evaluated at point C in FIG. 2. Accordingly, FIG. 2 may be interpreted to read the value of Cp as follows. Construct a line 281 or a line 282 from point B so that the constructed line is perpendicular to the ordinate or abscissa, respectively, at points labeled E and F, respectively. From simple geometric construction, the value of the fourth statistical measure Cp for process parameter A can be easily read from chart 160 as the value of first statistical measure CPU, when evaluated at point F, or as the value of second statistical measure CPL, when evaluated at point E, both values being equal to each other.

As with departure, the processes and process parameters can have different values of variability. So, if in the quality control process, one is focused on variability as a primary issue, the process parameters can be rank ordered according to a variability measure, e.g., from highest variability to lowest variability using either of the described variability measures. One can then use that rank ordering to prioritize the processes and process parameters so as to adjust the parameters in an order that obtains the most significant quality improvement with respect to reducing variability.

3. ANOTHER STATISTICAL MEASURE, CPK

A fifth statistical measure CPK, which is based on both departure and variability, may also be readily determined from the chart 160 in FIG. 2. The fifth measure is defined as the minimum of both CPU and CPL, i.e. the lesser of the first and the second statistical measures, at a (CPU, CPL) data point.

On the one hand, for any process parameter, which has a (CPU, CPL) data point above target line 210, its value of CPU will be less than its value of CPL. Therefore, the minimum of CPU or CPL for the data point will always be CPU. On the other hand, for any process parameter, which has a (CPU, CPL) data point below target line 210, its value of CPU will be greater than its value of CPL. Therefore, the minimum of CPU or CPL for that data point will always be CPL.

The value of the fifth measure CPK, therefore, is the value of the first measure CPU for data points above target line 210 and is the value of the second measure CPL for data points below target line 210. From our earlier discussion, any data point on target line 210 will have identical values for CPU and CPL and hence CPK will be either CPU or CPL.

As with departure and variability, the processes and process parameters can have different values of the fifth statistical measure CPK. So, if in the quality control process, one is focused on CPK as a primary issue, the process parameters can be rank ordered according to the CPK measure, e.g., from lowest CPK to highest CPK. One can then use that rank ordering to prioritize the processes and process parameters so as to adjust the parameters in an order that obtains the most significant quality improvement with respect to increasing CPK, which takes into consideration both departure and variability.

4. ESTIMATE OF EXPECTED FALL-OUT

In a quality control context, fall-out relates to the number of units of manufacture that are outside tolerance, such as the number of units which are outside the specification limits. To illustrate this concept, I will discuss fallout in relation to the proportion of values of a process parameter, which are outside specification limits.

Figure 3:
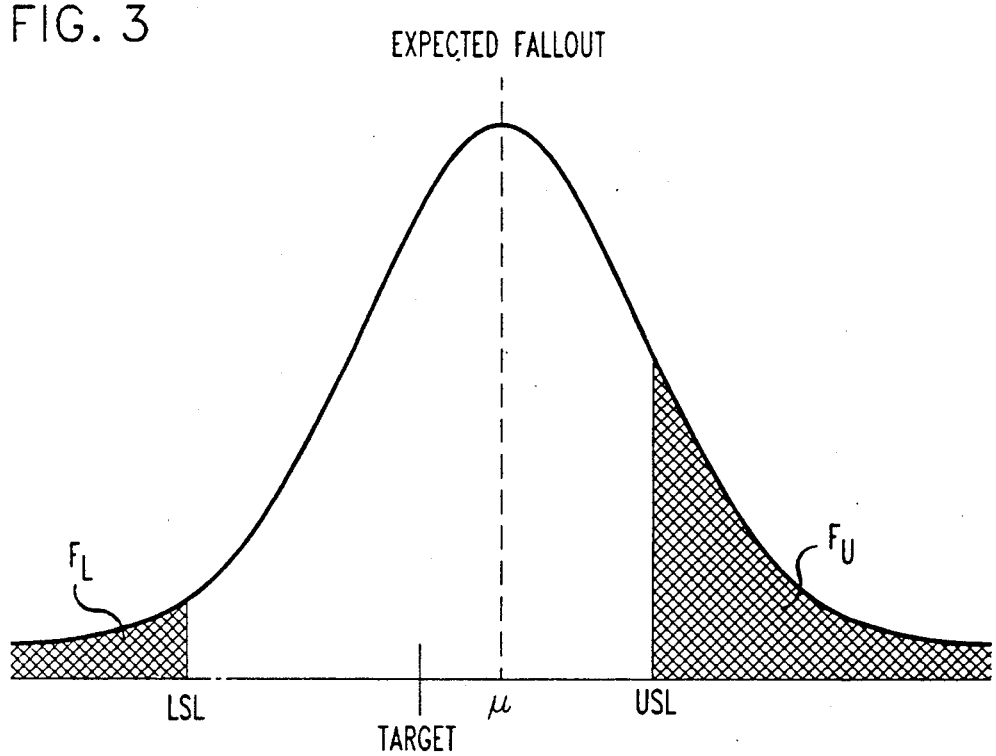
FIG. 3 illustrates a normal distribution curve, which is useful in illustrating an expected fall-out feature of the principles of my invention.

For purposes of illustration and not by way of limitation, I assume that the normal (bell shaped) distribution function, like in FIG. 3, which is well known in the art of statistics, applies to each process parameter in each process of the multi-process environment. A series of contour lines may be generated and illustrated on chart 160 in FIG. 5 for the purpose of estimating the expected fall-out for a process parameter. In my illustrative example, if a (CPU, CPL) data point for a process parameter is on a contour line, say on a 10 percent fall-out contour line, it would mean that 10 percent of the parameter values represented by that process parameter would be outside the tolerance or specifications limits, i.e., either greater than the USL or less than the LSL.

Figure 5:
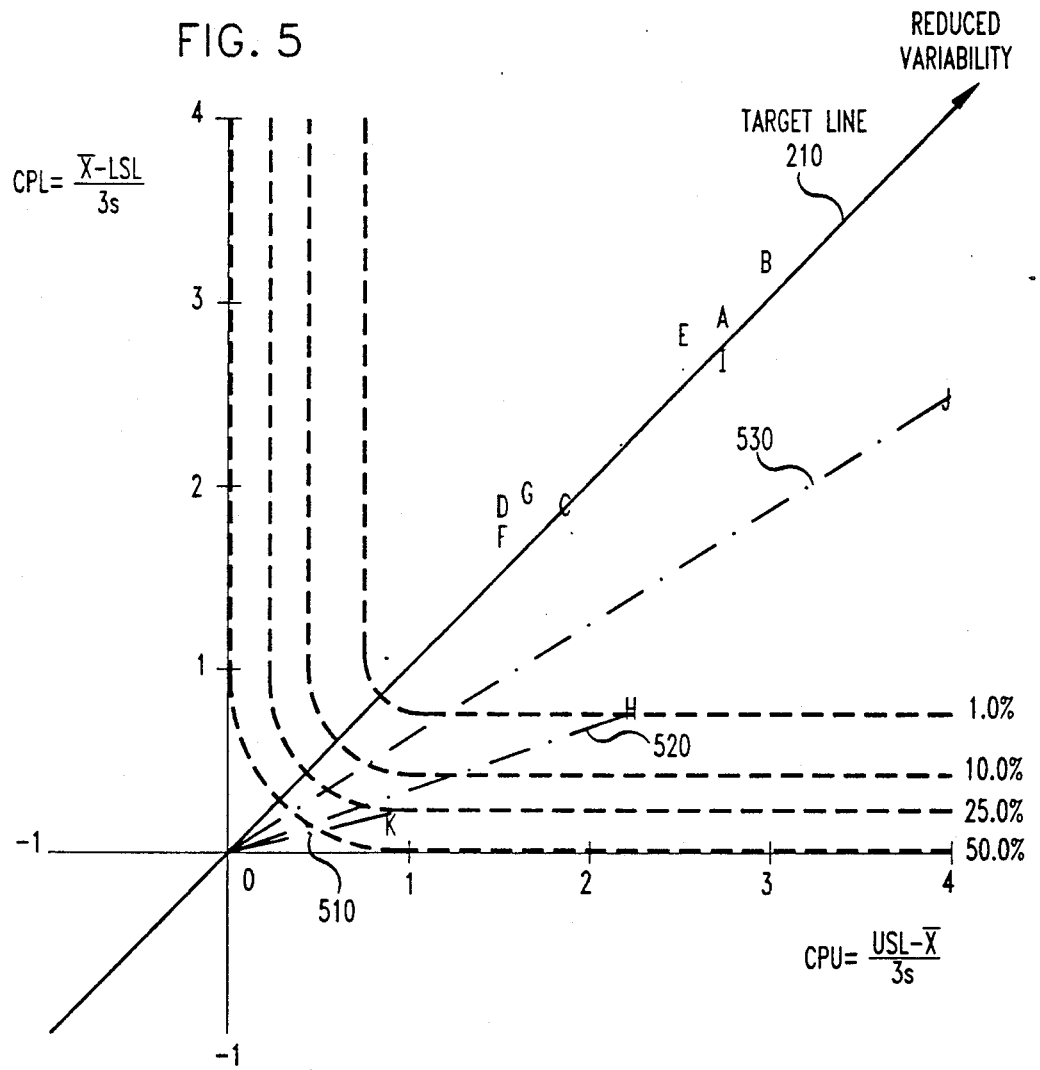
FIG. 5 illustrates another multi-process performance analysis chart, which is patterned upon the principles described relative to FIG. 1 and which is useful in describing the expected fall-out feature of the principles of my invention through the use of contour lines and which is useful in describing a prioritization feature of the principles of my invention.

I now turn to an illustrative methodology for generating a contour line as a function of CPU and CPL. Reference is made to any of a number of treatises on the subject of statistics, which include tables and equations for the normal (i.e. bell-shaped) distribution function. See, for example, I. Miller & J. E. Freund, "Probability and Statistics for Engineers," Prentice-Hall, Inc., Engelwood Cliffs, NJ, 2nd edition (1977), p. 487. A sample bell-shaped curve is illustrated in FIG. 3 as an aid in describing the contour feature of the principles of my invention and FIG. 4 illustrates a table, which, in summary form, illustrates some of the calculations used for generating a specific contour line corresponding to an expected fall-out of 10 percent. I will describe this one example in the generation of a 10 percent fallout contour line. Others can thereupon be readily made by the skilled artworker. The calculations for the 10 percent line, which are illustrated on FIG. 4, are well known in the art, and can be better understood in conjunction with the bell-shaped curve of FIG. 3. The generated contour line is shown in FIG. 5.

Let us arbitrarily set CPU equal to one. Referring to equation (1) for a definition of CPU and multiplying CPU by three gives a value of SU, which is defined on FIG. 4, equal to three. Using any of the textbook tables for a normal distribution function, the area under the standard normal curve from SU, when SU is set to three, to infinity is equal to 0.13 percent, which area is shown as area FU in FIG. 3 and which is mathematically defined in FIG. 4.

Inasmuch as this description assumes an expected fall-out of 10 percent and inasmuch as the area under the upper part of the normal curve, i.e., the part identified as FU, is 0.13 percent, the balance of the area under the lower part of the normal curve, which is shown as FL in FIG. 3 and is mathematically defined in FIG. 4, would equal the difference, or 9.87 percent, i.e. inasmuch as the fall-out can occur outside tolerance, meaning outside either USL or LSL, fall-out is the sum of FU and FL and that equals 10 percent. Again turning to the textbook tables for the normal distribution, the area under the standard normal curce from negative infinity to a value of SL is such that for an area FL to equal a value 9.87 percent, then the value of SL would be 1.29. Inasmuch as SL, as shown in in FIG. 4, is defined to be three times CPL, the corresponding value of CPL equals 0.43. A point on the 10 percent contour line then has a value of (CPU, CPL) equal to (1.00, 0.43) and that point may be marked on the chart 160 in FIG. 5. The above methodology may be repeated for a sufficient plurality of values of (CPU, CPL) to give rise to the 10 percent contour line. As mentioned, one with ordinary skill in the art and following the above example can do just that. FIG. 4 lists some 15 such points, which may be connected to form the 10 percent contour line shown on FIG. 5.

This methodology may be repeated for other values of expected fall-out. FIG. 5 illustrates four such contour lines for values of expected fall-out of 1.0 percent, 10.0 percent, 25.0 percent, and 50.0 percent.

Now having generated a number of contour lines on chart 160 in FIG. 5, the expected fall-out for a process parameter may be estimated based on the relative location of the contour lines with respect to the process parameter (CPU, CPL) data point on chart 160. For example, a new set of data points labeled A through K are illustrated in FIG. 5, i.e. new vis-a-vis the earlier described labeling in FIG. 2.

Now as an example, refer to point K in FIG. 5, it can be concluded that process parameter K, which corresponds to data point K, has an expected fall-out of between 25 percent and 50 percent. Interpolating between the 25 percent contour line and the 50 percent contour line leads to the further interpretation that process parameter K has an expected fall-out, which is closer to 25 percent than it is to 50 percent. Further, since data point H is on the 1 percent contour line, the expected fall-out of process parameter H is 1 percent. Still further, since the data points for the other process parameters are all above the 1 percent contour line, the expected fall-out for the other process parameters is less than 1 percent.

As with departure, variability, and CPK, the processes and process parameters can have different values of expected fall-out. So, if in the quality control process, one is focused on expected fall-out as a primary issue, the process parameters can be rank ordered according to an expected fall-out measure, e.g., from highest expected fall-out to lowest expected fall-out. One can then use that rank ordering to prioritize the processes and process parameters so as to adjust the parameters in an order that obtains the most significant quality improvement with respect to reducing expected fall-out.

QUICK SUMMARY REVIEW

Some further review of the above description in conjunction with FIG. 5 and the (CPU, CPL) data points labeled A through K and illustrated thereon will highlight certain points made in my description of how the process of generating multidimensional chart 160 in a multi-process environment can assist the user of chart 160 in the evaluating, prioritizing and determining the adjustment of the plurality of process parameters to improve the overall quality of the multi-process environment.

For example, note that point C is on target line 210. That is interpreted to mean that the arithmetic mean of parameter C is equal to its target value and has zero departure. Similarly, note that point G is above target line 210 and that point I is below target line 210. Those observations are interpreted to mean that process parameters G and I have departure and that the arithmetic mean of parameter G is greater than its target value, while the arithmetic mean of parameter I is less than its target value.

Note that lines 510, 520 and 530 have been drawn between the origin of chart 160 and respective data points K, H and J. The angles made between target line 210 and lines 510, 520 and 530, respectively, may be rank ordered from largest to smallest. Those observations are interpreted to mean that parameter K has the highest relative departure, parameter H has the next highest relative and parameter J has the lowest relative departure as among the three parameters K, H and J and one could prioritize the adjustment of those parameters in that same order.

Note that lines patterned after line 280 in FIG. 2 could be drawn on chart 160 in FIG. 5. The resultant observation would be interpreted to mean that parameter K has the highest relative variability of all the process parameters while parameter B has the lowest relative variability of all the process parameters A through K and one could prioritize the adjustment of those parameters in that same order.

Note that the fifth statistial measure CPK can readily be generated for the (CPU, CPL) data points. CPK for parameter K is a CPL value of about 0.2, while CPK for parameters D and F is a CPU value of about 1.5, and one could prioritize the adjustment of those parameters in that same order.

Note further, in light of my brief example, the quality control process can be prioritized, for example, to firstly address an improvement to the process of which parameter K is an element and to secondly address an improvement to the process of which parameter H is an element. Why parameter K first and parameter H second? The prioritization could be in response to a conclusion that, since sampling measurements of parameters K and H in the manufacturing process have shown the highest expected fall-out to have occurred in those two process parameters, the greatest improvement in quality control can be achieved by improving the first process of which parameter K is an element and then second, the process of which parameter H is an element.

Chart 160 has been used to illustrate certain of the principles of my invention from a multi-process performance analysis point of view. At least two other points of view are feasible with chart 160, namely, from a second point of view of a multi-process shift analysis and from a third point of view of a multi-parameter analysis.

For example, from the second point of view, let the tolerances be control limits rather than specification limits. The first statistical measure CPU from equation (1) and the second statistical measure CPL from equation (2) can be rewritten as:

$$CPU = \frac{UCL - \bar{\bar{x}}}{3\sigma_x} \quad (7)$$

$$CPU = \frac{\bar{\bar{x}} - LCL}{3\sigma_x} \quad (8)$$

where UCL is an upper control limit, which is a statistical tolerance value, and where LCL is a lower control limit, which is another statistical tolerance value, and where $\bar{\bar{X}}$ is the arithmetic means of the sample means $\bar{x}$'s of a process and where $\sigma_{\bar{x}}$ is the standard deviation of the sample means $\bar{x}$'s of the process.

For example, from the third point of view, the sampled observations may be taken from a "lot" or "batch" of units rather than from a group of processes in a multi-processing environment. This point of view allows us to illustrate the test/inspection results of multi-parameters of an incoming shipment or final product lot.

Although my invention has been described and illustrated in detail, it is to be understood that the same is not by way of limitation. For example, while I have described prioritization in terms of rank ordering the process parameters to be adjusted in terms of relative departure or in terms of variability or in terms of expected fall-out or in terms of CPK, the prioritization could be in terms of the relative cost savings resulting from adjusting a process parameter. Hence the spirit and scope of my invention is limited only by the terms of the appended claims.

I claim:

1. A method for manufacturing a product, the method having one or more manufacturing processing steps, each said manufacturing process step having one or more process parameters associated with respective predetermined tolerance values, said method including means for monitoring information relating to selected ones of the process parameters, and means responsive to the monitored information for estimating predetermined characteristics of the process parameters, said monitored information characterizing the quality of the product being manufactured, wherein the improvement comprises the steps of:
   (a) responding to the estimates and to the monitored information by measuring the current values of said manufacturing process parameters and generating first and second indices for each of said manufacturing process parameters;
   (b) aggregating said first and second indices generated for each of said manufacturing process parameters into a multi-dimensional space representation of the measured manufacturing process parameters;
   (c) comparing respective ones of the space represented aggregated indices with other respective ones of the space represented aggregated indices of the measured process parameters and with a predetermined reference value to determine which ones of said manufacturing process parameters are not within their respective tolerance values; and
   (e) responding to the results of said comparison by adjusting said manufacturing processes steps whose respective process parameters are not within their respective tolerance values in order to improve the operation of such manufacturing processes and thus the quality of the product being manufactured.

2. The method defined in claim 1 further comprising the step of:
   (g) repeating the steps of claim 1 until the results of said adjustment evidence no further adjustment is needed.

3. The method defined in claim 1 further comprising the step of
   (f) determining as a function of the results of said comparison which of the manufacturing processes that are more likely to need adjustment and adjusting those manufacturing processes.

4. The method defined in claim 3 further comprising the step of:
   (g) adjusting those processes in their prioritized order.

5. The method defined in claim 3 wherein the prioritizing step further comprises the steps of:
   (g) generating a first departure value for a first manufacturing process parameter;
   (h) generating a second departure value for a second manufacturing process parameter;
   (i) comparing the first departure value with the second departure value; and
   establishing a prioritized order for adjusting the respective manufacturing parameter as a function of the results obtained from comparing the first and second departure values with one another.

6. The method defined in claim 3 wherein the prioritizing step further comprises the step of:
   (g) generating a first variability value for a first manufacturing process parameter;

(h) generating a second variability value for a second manufacturing process parameter;
(i) comparing the first variability value with the second variability value; and
(j) responding to the comparison of the first and the second variability values by establishing a prioritized order for adjusting the respective manufacturing parameter.

7. The method defined in claim 3 wherein the prioritizing step further comprises the steps of:
(f) comparing the first and second indices of each of a first and a second manufacturing process parameter; and
(g) responding to the comparison by determining the minimum of such indices for each of the first and the second manufacturing parameters; and
(h) responding to the minimum indices by establishing a prioritized order for adjusting the respective first and the second manufacturing process parameters.

8. A system for manufacturing a product, the system having one or more manufacturing processes each associated with one or more process parameters, each process parameter having predetermined tolerances, and the system having means for monitoring information relating to selected ones of the process parameters, means responsive to the monitored information for estimating predetermined characteristics of the manufacturing process parameters and means responsive to the estimates and to the monitored information, for characterizing the quality of the product being manufactured, wherein the improvement comprises:
(a) means, responsive to the estimates and to the monitored information, for measuring the current values of said manufacturing process parameters and generating a first and a second index for each of the manufacturing process parameters;
(b) means for aggregating the first and second indices for a plurality of manufacturing process parameters into a multi-dimensional space representation of the measured process parameters;
(c) means for comparing respective ones of the space represented aggregated indices of the measured manufacturing process parameters with other respective ones of the space represented aggregated indices of the measured manufacturing process parameters and with a predetermined reference value to determine which ones of the manufacturing process parameters are not within their respective tolerance values; and
(e) means, responsive to the results of said comparison, for determining which of the manufacturing process parameters need to be adjusted and adjusting said manufacturing process parameters in order to improve the operation of such manufacturing processes and thus the quality of the product being manufactured.

9. The system defined in claim 8 further comprising:
(f) means, responsive to the results of said adjustment for adjusting those of said manufacturing process parameters that need to be adjusted.

10. The system defined in claim 8 further comprising:
(f) means, responsive to the adjustment determination results, for prioritizing the processes that are more likely to need adjustment.

11. The system defined in claim 8 further comprising:
(g) means for adjusting in those processes in their prioritized order.

12. The system defined in claim 10 wherein the prioritizing means further comprises:
(g) means for generating a first departure value:
(h) means for generating a second departure value for a second manufacturing process parameter;
(i) means for comparing the first departure value and the second departure value; and
(j) means, responsive to the comparison of the first and the second departure values, for establishing a prioritized order for adjusting the respective parameters as a function of the results obtained from comparing the first and second departure values with one another.

13. The system defined in claim 10 wherein the prioritizing means further comprises:
(h) means for generating a first variability value for a first manufacturing process parameter;
(h) means for generating a second variability value for a second manufacturing process parameter;
(i) means for comparing the first variability value and the second variability value; and
(j) means, responsive to the comparison of the first and the second variability values, for establishing a prioritized order for adjusting the respective manufacturing parameter.

14. The system defined in claim 10 wherein the prioritizing means further comprises:
(f) means for comparing the first and second indices of each of a first and a second process parameter;
(g) means, responsive to the comparison, for determining the minimum of such indices for each of the first and the second parameters; and
(h) means, responsive to the minimum indices, for establishing a prioritized order for adjusting the respective first and second process parameters.

* * * * *